US008683216B2

United States Patent
Harmonen

(10) Patent No.: US 8,683,216 B2
(45) Date of Patent: Mar. 25, 2014

(54) IDENTIFYING POLYMORPHIC MALWARE

(75) Inventor: Timo Harmonen, Espoo (FI)

(73) Assignee: F-Secure Corporation, Helsinki (FI)

( * ) Notice: Subject to any disclaimer, the term of this patent is extended or adjusted under 35 U.S.C. 154(b) by 415 days.

(21) Appl. No.: 12/804,123

(22) Filed: Jul. 13, 2010

(65) Prior Publication Data

US 2012/0017275 A1    Jan. 19, 2012

(51) Int. Cl.
    *H04L 29/06*    (2006.01)
(52) U.S. Cl.
    USPC ............................... 713/188; 713/187; 726/24
(58) Field of Classification Search
    USPC .............................................. 726/24; 713/188
    See application file for complete search history.

(56) References Cited

U.S. PATENT DOCUMENTS

| 7,987,160 | B2 * | 7/2011 | Brodie et al. ................ 707/690 |
| 2003/0200441 | A1 * | 10/2003 | Jeffries et al. ................ 713/181 |
| 2005/0132184 | A1 * | 6/2005 | Palliyil et al. ................ 713/152 |
| 2007/0226802 | A1 * | 9/2007 | Gopalan et al. ................ 726/24 |
| 2007/0276838 | A1 * | 11/2007 | Abushanab et al. ............ 707/10 |
| 2009/0282476 | A1 * | 11/2009 | Nachenberg et al. ............ 726/22 |
| 2009/0300761 | A1 * | 12/2009 | Park et al. ................ 726/23 |
| 2010/0083376 | A1 * | 4/2010 | Pereira et al. ................ 726/22 |
| 2010/0192222 | A1 * | 7/2010 | Stokes et al. ................ 726/22 |
| 2010/0205671 | A1 * | 8/2010 | Milliken et al. ................ 726/23 |

* cited by examiner

*Primary Examiner* — Mohammad L Rahman
(74) *Attorney, Agent, or Firm* — Harrington & Smith

(57) ABSTRACT

A method and apparatus for identifying an electronic file as polymorphic malware. A server receives from a client device a hash value and metadata associated with an electronic file. The server determines that the received metadata relates to corresponding metadata stored at a database, the corresponding stored metadata being associated with a further hash value that differs from the received hash value. A determination is made that each of the received hash values have been reported by fewer than a predetermined number of clients and, as a result, it is determined that the electronic file is likely to be polymorphic malware.

11 Claims, 3 Drawing Sheets

IDENTIFYING POLYMORPHIC MALWARE

FIELD OF THE INVENTION

The present invention relates to identifying polymorphic malware on a computer system.

BACKGROUND TO THE INVENTION

Malware infection of computers and computer systems is a growing problem. Recently there have been many high profile examples where computer malware has spread rapidly around the world causing many millions of pounds worth of damage in terms of lost data and lost working time.

Malware is often spread using a computer virus. Early viruses were spread by the copying of infected electronic files onto floppy disks, and the transfer of the electronic file from the disk onto a previously uninfected computer. When the user tries to open the infected electronic file, the malware is triggered and the computer infected. More recently, viruses have been spread via the Internet, for example using e-mail. In the future it can be expected that viruses will be spread by the wireless transmission of data, for example by communications between mobile communication devices using a cellular telephone network.

Various anti-virus applications are available on the market. These tend to work by maintaining a database of fingerprints for known viruses and malware. With a "real time" scanning application, when a user tries to perform an operation on a file, e.g. open, save, or copy, the request is redirected to the anti-virus application. If the application has no existing record of the electronic file, the electronic file is scanned for known virus or malware fingerprints. If a virus or malware is identified in a file, the anti-virus application can take appropriate action, such as reporting this to the user, notifying an administrator, disinfecting or blocking the virus of malware. The anti-virus application may then add the identity of the infected file to a register of infected files.

The database for the anti-virus application may be maintained locally at the computer system, or may be located remotely from a client computer system, for example at a server. The server may also be used to perform a determination of whether the electronic file is malware. In this case, a client device that finds a suspicious electronic file sends signature information and other metadata information relating to the electronic file to the server that helps the server to detect malware files by comparing the signature and other metadata of the suspicious electronic file with fingerprints listed in a fingerprint database. Once the server has identified the suspicious electronic file (either as malware or not) it reports back to the client.

Fingerprints are patterns that are used to identify malware or clean files. Fingerprints are often based on some kind of signatures calculated in the client. Signatures can be simple full or partial file hashes, or may be generated using more complex static file analysis or dynamic behavioural analysis. Static smart signatures are determined by statically calculating different hashes over various parts of the suspicious electronic file, or using some other static file properties. Dynamic behavioural analysis may be, for example, analysing how the malware affects a computer system environment, running the malware in a virtual environment or monitoring the malware during runtime. Dynamic signatures are calculated based on the behaviour of the suspicious electronic file, for example by using the results of running the suspicious electronic file in a small virtual environment and hashing the results from the execution path analysis.

Metadata sent from the client to the server need not be just signature data. For example, file usage information, a download URL associated with the suspicious electronic file, file name and location, identities of any associated files or dynamic link libraries, registry changes etc could also be sent. Fingerprints can be created not just using the signature data but also based on other metadata. For example, an electronic file could be identified as malware or clean purely based on the download URL.

There are several advantages of using a client/server model, rather than storing the anti-virus application and the database locally at a computer device. These include the following:

1) There is no need to download full malware fingerprints to each client device, only the relevant ones.
2) When new malware is detected, it is "published" immediately at the server and available to all client devices. There is no need for each client device to wait for next scheduled database update. This ensures that each client device is protected against new malware as soon as possible after it is identified.
3) Data obtained from an anti-virus server can be used to obtain knowledge of the global malware situation, as the server sees queried signatures and can use those, for example, for case prioritization. Furthermore, it can be used to perform a statistical analysis to give a "reputation verdict", which can be used to determine whether or not to allow execution of a suspicious file.

Creators of malware use many different ways to avoid detection when writing malware. An obvious way to avoid detection is to change the malware in such a way that a detection fingerprint that is stored in a fingerprint database no longer matches with the malware. Typically, it is easier to change static file attributes such as a full file hash. Behavioural based signature detection is more difficult for a malware writer to circumvent.

Polymorphic malware is malware that can be packed in different ways in order to generate packed electronic files that are binary executable files and include an unpacker. The packed electronic files are different, so have different hash values. This is typically done using an encryption technique. In extreme cases, each copy of the packed electronic file is different. This makes it very difficult for an anti-virus application to identify the packed binary executable file as malware from its static signatures alone.

Anti-virus applications address this problem by calculating signatures used for creating fingerprints from the unpacked form of the malware. This requires the anti-virus application to have reliable unpacking algorithms, as an anti-Virus program is only able to detect server side polymorphic malware using signature detection if it knows how to unpack the original form of the malware file and, it has detection fingerprint for the unpacked malware.

As every copy of the malware is unique (or at least very rare), polymorphism is an effective stealth mechanism to attempt to avoid detection. It is difficult for an anti-virus vendor to identify a new still undetected polymorphic malware, or variants of existing ones, and add detections for those to the database. Using the client-server model helps with the problem, as anti-virus server sees queried signatures and other related metadata and can maintain a list of most popular unknown files with all the metadata for further analysis and possible identification as malware. However, as packed versions of polymorphic malware are unique (or at least uncommon), they will not be directly visible in a "most-popular unknown files" list. This makes them more difficult to identify and prioritize for further analysis.

SUMMARY OF THE INVENTION

The inventor has realised the problems associated with identifying polymorphic malware. It is an object of the invention to provide improved ways of identifying polymorphic malware.

According to a first aspect of the invention, there is provided a method of identifying an electronic file as polymorphic malware. A server receives from a client device a hash value and metadata associated with an electronic file. The server determines that the received metadata relates to corresponding metadata stored at a database, the corresponding stored metadata being associated with a further hash value that differs from the received hash value. A determination is made that each of the received hash values have been reported by fewer than a predetermined number of clients and, as a result, it is determined that the electronic file is likely to be polymorphic malware.

As an option, the method further comprises comparing the received hash value and metadata with known fingerprints stored at the database. If a portion (or all) of the hash value or received metadata corresponds to a portion of a fingerprint stored at the database, then a determination is made that the electronic file is clean or malware. The method optionally comprises, in the event that a determination cannot be made that the electronic file is likely or not likely to be polymorphic malware, alerting a user.

As an option, metadata is added to the database. This ensures that the queries from a client device can be used to extend the database and improve results for future queries from the same or other client devices.

The method optionally further comprises, in the event that it is determined that the electronic file is likely to be polymorphic malware, prioritizing the electronic file for further analysis.

The server may generate a fingerprint for the suspicious file, the fingerprint being based on the received metadata.

According to a second aspect of the invention, there is provided an anti-virus server comprising a receiver for receiving from a client device a received hash value and received metadata associated with an electronic file. The anti-virus server is provided with means to access a database in which are stored records of queries from other client devices, each record comprising a hash value and metadata, the metadata being stored in clusters of similar metadata. A processor is provided for determining that the received metadata relates to corresponding metadata stored at the database, the corresponding stored metadata being associated with a further hash value that differs from the received hash value. The processor is further arranged to determine that fewer than a predetermined number of queries including hash values matching the received hash value have been received by the server, and consequently determine that the electronic file is likely to be polymorphic malware.

As an option, the processor is arranged to compare the received hash value and metadata with known fingerprints stored at the database. If a portion (or all) of the hash value or received metadata corresponds to a portion of a fingerprint stored at the database, then the processor determines that the electronic file is clean or malware.

The processor is optionally further arranged to alert a user in the event that a determination that the electronic file is likely to be polymorphic malware cannot be made.

The processor may be arranged to add the received metadata to the metadata cluster in the database. This can be used for further queries, regardless of whether the electronic file has been determined to be polymorphic malware.

In an embodiment of the invention, the processor is arranged to prioritize the electronic file for further analysis in the event that it is determined that the electronic file is likely to be polymorphic malware.

The processor may be arranged to generate a fingerprint for the suspicious file, the fingerprint being based on the received metadata.

According to a third aspect of the invention, there is provided a computer program that comprises computer readable code which, when run on a server, causes the server to perform the method as described above in the first aspect of the invention.

According to a fourth aspect of the invention, there is provided a computer program product comprising a computer readable medium and a computer program described above in the third aspect of the invention, wherein the computer program is stored on the computer readable medium.

DETAILED DESCRIPTION OF CERTAIN EMBODIMENTS

Consider a scenario in which an anti-virus client/server model is used, where the server performs some analysis of suspicious electronic files on behalf of a client, and has access to a database. An anti-virus application at the client device performs a scan of a memory or disk at the client device and scans executable files in order to detect a suspicious electronic file. The client can then send a query to the server in order to determine whether or not the suspicious file is malware. The client can use signatures or other metadata as a key in a server query to identify the suspicious file. Examples of metadata information relating to the suspicious electronic file include usage information, a download URL associated with the suspicious electronic file, file name and location, identities of any associated files or dynamic link libraries, registry changes, execution log, networking connections made by the electronic file and so on. The server will therefore receive a lot of metadata about the executable files seen by the Anti-Virus clients.

The metadata is stored in a database and can be "clustered" using various algorithms, in order to identify similarities between metadata associated with two suspicious files. A "cluster" of metadata is used to describe a group of metadata received for different unique files, possible from several client devices, where the metadata is considered to have similarities. A strong correlation between the metadata of two suspicious files is an indication that those files are somehow linked. It may be that the two suspicious files are different variants of a malware, or packed examples of polymorphic malware, or a new version of legitimate software.

Figure 1:
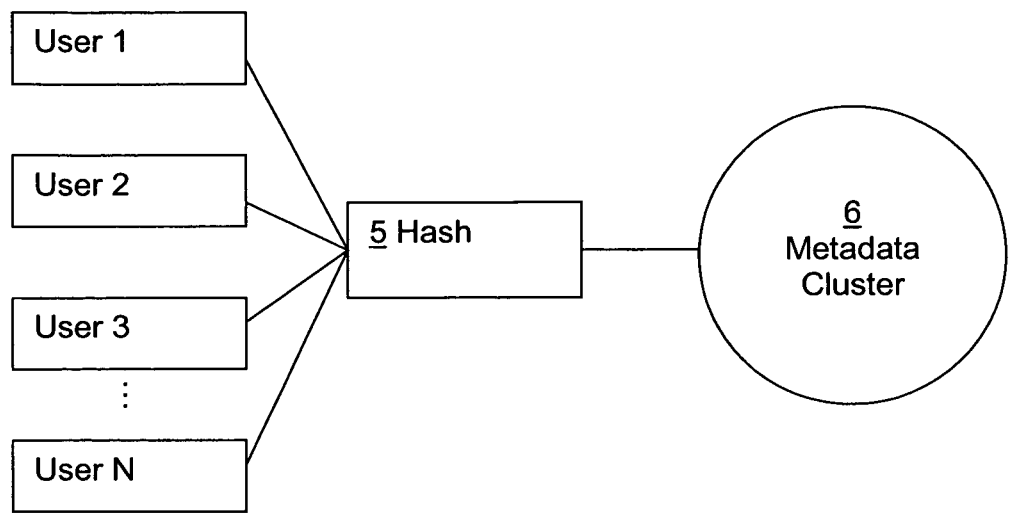
FIG. 1 illustrates schematically in a block diagram a hash value and associated metadata for a typical legitimate software application.
Figure 2:
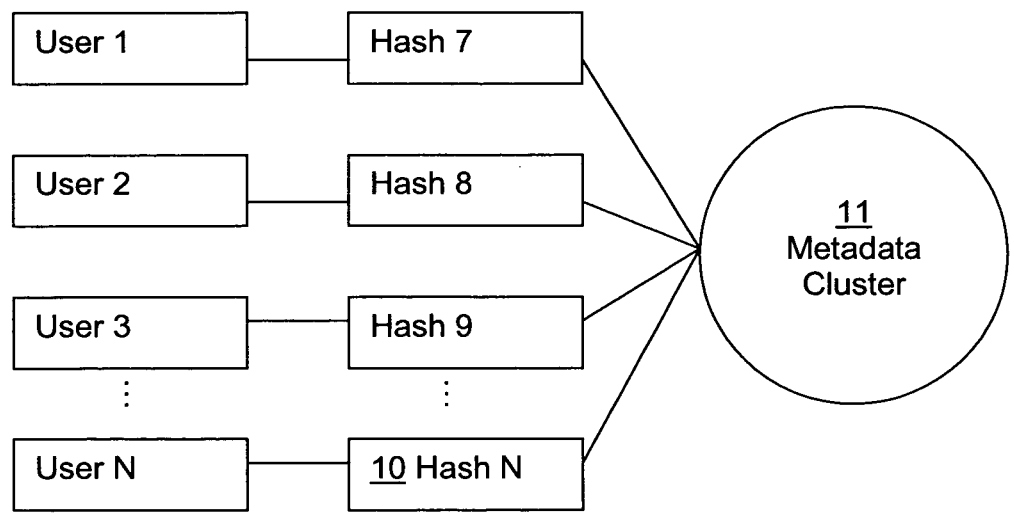
FIG. 2 illustrates schematically in a block diagram hash values and associated metadata for a polymorphic malware.

Turning to FIG. 1, there is illustrated an example of a hash value for a typical legitimate executable binary, or an executable binary for a malware that is not polymorphic. In this example, Users 1 to N all send queries to the server relating to the same executable binary. As the executable binary is the same for each user, each user presents the same Hash value 5. One or more users may also send metadata associated with the file. The metadata is stored at the database in a cluster 6 and associated with the binary executable.

In the case of polymorphic malware, several different hash values are associated with each packed executable binary generated by the malware. As described above, there may be as many hash values as there as instances of the packed executable binary. In this instance, User 1 sends a hash value 7 to the server, User 2 sends hash value 8 to the server, User 3 sends hash value 9 to the server, and User N sends hash value N 10 to the server. The users also send metadata associated with the binary executable. The metadata is examined and similarities are found between some of the metadata. If there are sufficient similarities, the metadata is associated together as a cluster 11. There may be sufficient similarities for the server to positively determine that each hash value relates to the same malware despite having different hash values. Alternatively, if the server cannot make a positive identification, it may flag the metadata cluster and associated hash values to a user for further investigation.

The correlation of the metadata and the full file hashes being different allows the server to identify the packed binary executable as malware.

Figure 3:
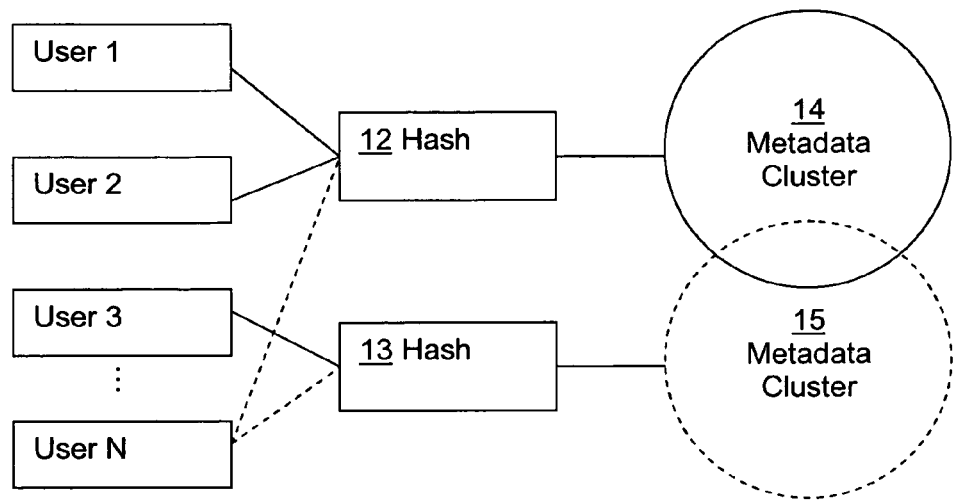
FIG. 3 illustrates schematically in a block diagram hash values and associated metadata for different versions of a typical legitimate software application.

There are some instances where a binary executable, dll, driver etc. of a legitimate software application have different hash values. The following description refers to electronic files, and it will be appreciated that this applies to any type of data such as a binary executable, dll and so on, that may be used to harbour malware, and may also refer to combinations of electronic files. For example, FIG. 3 illustrates a scenario in which a legitimate electronic file is updated and a new version is released. In this case, Users 1 and 2 have an older version of the legitimate electronic file on their client computer devices. The older version of the legitimate electronic file has a hash value 12 associated with a binary executable. On the other hand, user 3 has a newer version of the legitimate electronic file, which has hash value 13 associated with a binary executable. User N may have either version installed. When a user sends a hash value to the server, he also sends the associated metadata. The server receives many identical hash values associated with the earlier version of the legitimate electronic file, and many identical hash values associated with the later version of the legitimate electronic file. A metadata cluster 14, 15 is created for each hash value. The server will receive messages from many users relating to the same legitimate electronic file, and of the many requests relating to the legitimate electronic file, only a few associated hash values are received. This is indicative to the server that the legitimate electronic file is not polymorphic malware. Different versions of the legitimate electronic file may lead to variations in the associated metadata, but in most cases there will be some overlap between the metadata cluster 14 associated with hash 12 and the metadata cluster 15 associated with hash 13.

Where the server identifies the metadata cluster as belonging to a legitimate electronic file, it may add a fingerprint derived from the received metadata to a whitelist of fingerprints known to belong to a legitimate electronic file.

Figure 4:
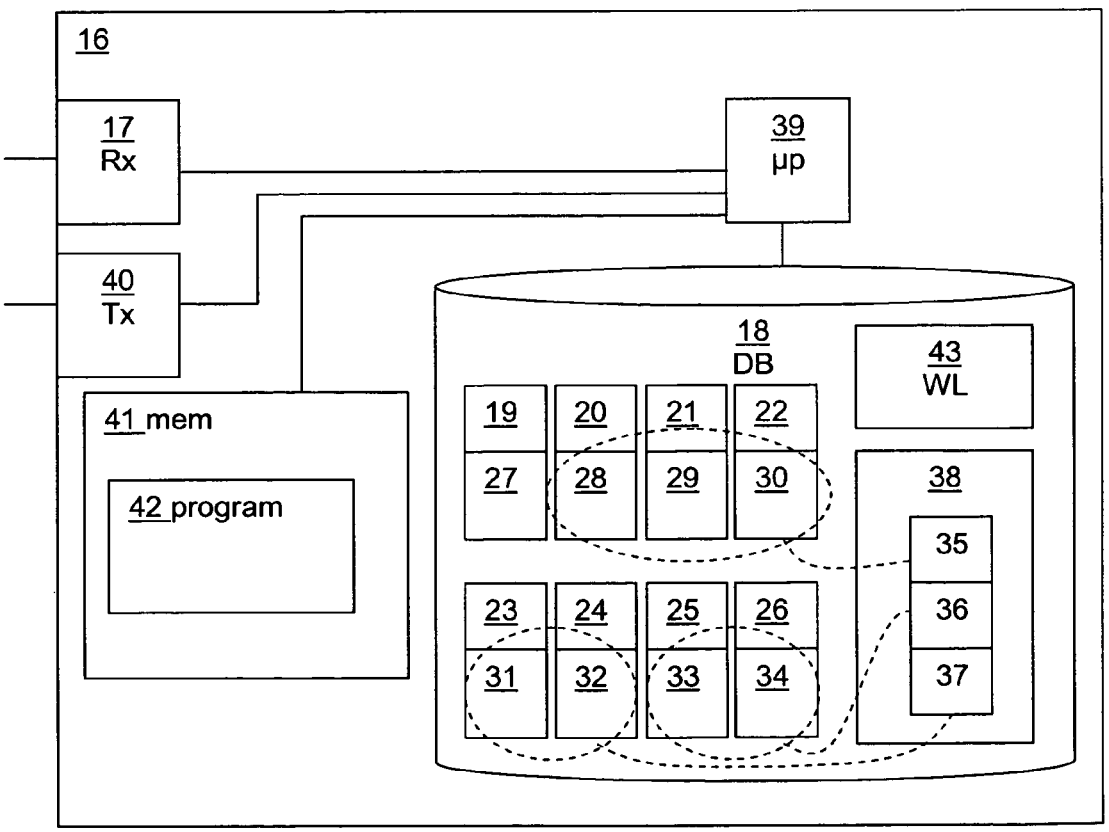
FIG. 4 illustrates schematically in a block diagram a server according to an embodiment of the invention.

Referring now to FIG. 4, there is illustrated an anti-virus server 16. The server 16 is provided with a receiver 17 for receiving a hash value and associated metadata from a client device in the event that the client device considers an electronic file to be suspicious.

The server 16 is also provided with a database 18. Note that the database 18 is illustrated as being located at the server. However, the skilled person will realise that in an alternative embodiment, the database 18 may be located remotely from the server 16. The server 16 therefore only requires means to access the database 18, such as a remote connection where the database is located remotely from the server. The database is used to store records of previous queried items (hashes) from client devices. Each record includes a hash value 19-26 and associated metadata 27-34. The metadata is further grouped into clusters 35-37. For example, cluster 35 comprises metadata 28-30, cluster 36 includes metadata 31 and 32, and cluster 37 includes metadata 33 and 34. A table of clusters 38 is also stored with links (illustrated by dashed lines) to the associated pairs of hashes and metadata. In addition to the clusters, further information such as whether hashes and metadata associated with the cluster are known to be associated with malware or not may also be stored. It will be appreciated that this arrangement is shown for simplicity, and there are many different ways in which the data may be stored and associated with other data in the database 18 provided that clusters of similar data can be identified. For example, an item of metadata and related hash values may be associated with more than one cluster.

A processor 39 is provided for comparing the received hash value with hash values 19-26 stored in the database 18. If it is determined that the received hash value matches fewer than a predetermined number of hash values 19-26, or none of the hash values 19-26, then the processor 38 goes on to compare the received metadata with the metadata clusters 35-37 stored at the database 18. If the processor 39 finds sufficient similarities between the received metadata and one of the clusters of metadata associated with malware or a clean electronic file, then it can reasonably assume that the received metadata is respectively associated with that specific malware or clean electronic file. A transmitter 40 is provided to report this to the client device. Therefore by comparing metadata, such as smart signatures and behavioural signatures, the server can determine that the corresponding electronic file is the same even if the hash values do not match.

A computer readable medium in the form of a memory 41 is also provided, on which a computer program 42 is stored. When executed by the processor 29, the server behaves as described above.

The database 18 may also be used to store a fingerprint whitelist 43. The whitelist 43 may be a part of the metadata cluster table 43, as it can be thought of as a cluster of metadata relating to known clean electronic files, or it may be stored separately. This may be created when legitimate electronic files are polymorphic. Legitimate electronic files that are polymorphic would otherwise cause the server to falsely identify them as polymorphic malware. A legitimate electronic file may be polymorphic when, for example, it creates copies of a binary executable file that are unique to each user. This may be done for licensing or Digital Rights Management reasons.

By monitoring incoming queries and other meta-data from client devices, the server 16 automatically clusters metadata received from the clients, linking closely similar metadata to the same cluster. In order to keep the database 18 records up to date, information from queries is stored in the database, including the hash value and the metadata. The hash value and metadata can, if relevant, be linked with an existing metadata cluster, or used to create a new cluster The server 16 can recognize either new polymorphic malware or a variant of known polymorphic malware by recognizing patterns in clusters of metadata, and similarities between received metadata and stored clusters of metadata.

In some cases, the degree of similarity between a metadata cluster and the received metadata may be sufficiently ambiguous for the server to be unable to determine whether or not the received metadata is associated with the same electronic file as the metadata cluster. In this case, the processor 39 is arranged to alert a user to this fact. The user can then investigate the received metadata and hash further. For example, if metadata cannot be used to classify the electronic file as malware or clean, the original file can be obtained and other known methods of file analysis can be used.

The server 16 can also prioritize possible malware cases for further analysis in the case where it identifies a new interesting metadata cluster that is not yet associated with a server side polymorphic malware or with a clean electronic file.

The server 16 may also automatically generate generic fingerprints for polymorphic malware, which are not based on hash values but are instead based on received metadata. The behaviour of the suspicious file may be unique regardless of the hash value of the binary executable, and this can be used to identify malware. The collection of metadata clusters in the database 18 provides a good starting point for generating such fingerprints.

Figure 5:
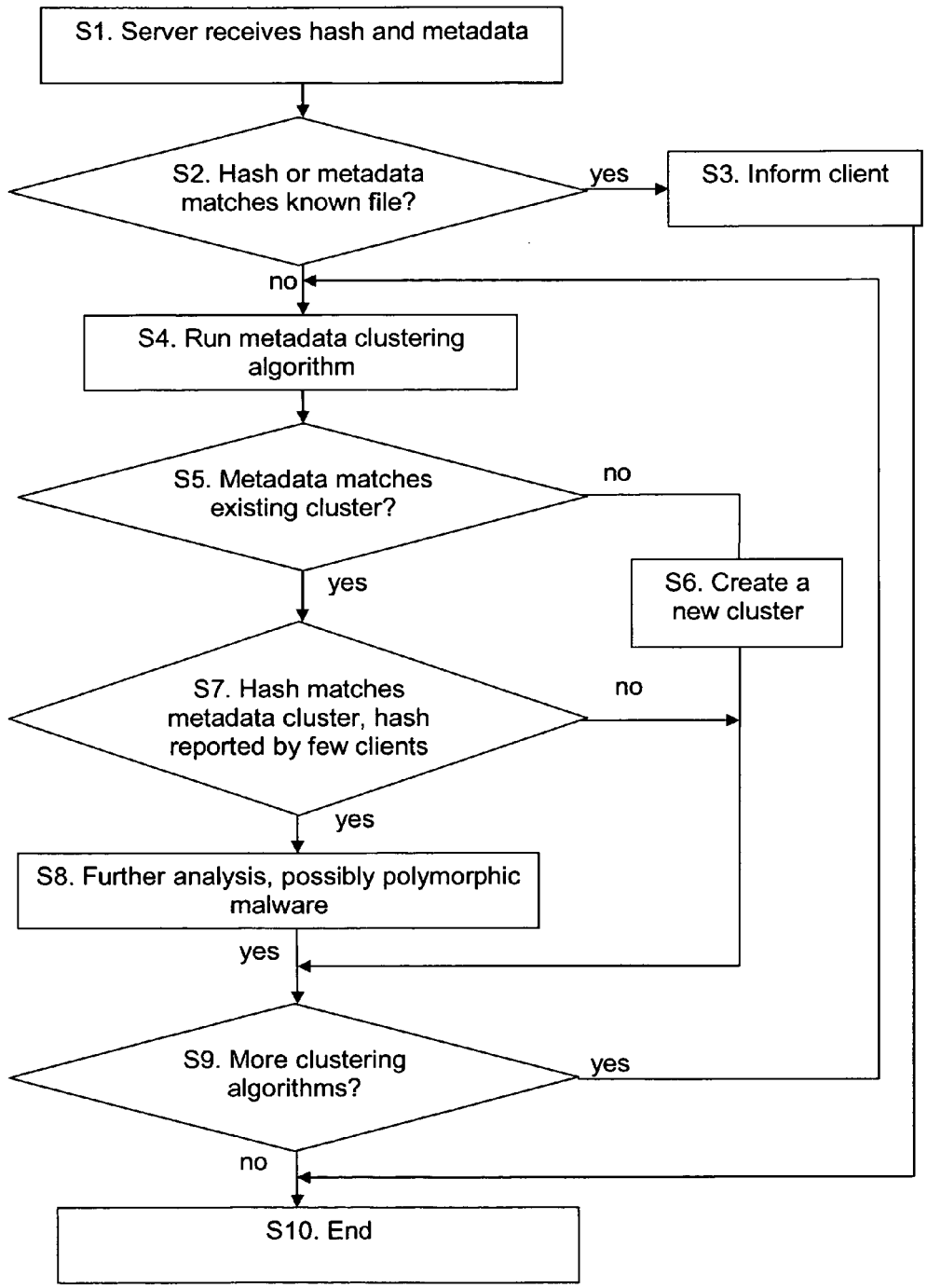
FIG. 5 is a flow diagram illustrating the steps of an embodiment of the invention.

FIG. 5 is a flow diagram illustrating the steps that the server 16 carries out. The following numbering corresponds to that of FIG. 5:

S1. A client device performs a scan and identifies a suspicious file. It sends a full file hash value and metadata associated with the suspicious file to the server 16. The metadata may be used to create a fingerprint to identify the suspicious file S2. The server 16 may check to see whether the hash value matches a hash value in the database 18, or the metadata matches a corresponding fingerprint in the database 18, either for known malware or clean files. If so then the method proceeds to step S3, if not then the method proceeds to step S4.

S3. As the hash value or a signature or other metadata matches with a fingerprint for known malware or clean file, the status is returned for client for further actions (this is an optional step).

S4. If the scanned file is not identified as a clean file or malware using the hash or fingerprint check of step S2, then metadata is used for further analysing the unknown file. The received metadata is compared with clusters of metadata stored at the database 18. Various algorithms may be used to compare different types of metadata. Metadata is processed by running a clustering algorithm that classifies closely related files to the same clusters.

S5. A determination is made whether or not the received metadata sufficiently corresponds to an existing metadata cluster stored in the database 18. If so, then the method continues at step S7, if not then method proceeds at step S6.

S6. A new cluster is created using the received metadata, and the method proceeds at step S9.

S7. A determination is made to ascertain whether or not the metadata cluster has at least two (and in some cases several) different hash values associated with it, and if so whether each of those hash values have been reported to the server by fewer than a predetermined number of client devices.

If so, then the file is likely to be polymorphic malware and the method proceeds to step S8, otherwise the file is unlikely to be polymorphic malware and the method continues at step S9.

S8. A determination is made that the file is possible a polymorphic malware, and further analysis may be performed on the file. If the results indicate that the file is likely to be polymorphic malware, then further steps may include any of reporting to the client device, alerting an analyst, adding signature information derived from the metadata to the database and so on.

S9. If there are further clustering algorithms that may be used in order to identify whether the metadata matches an existing cluster, then the method reverts to step S4, otherwise the method ends at step S10.

The invention allows the identification by a server of polymorphic malware with unique (or uncommon) hash values by comparing metadata associated with a file with metadata stored in a database that has previously been obtained from other client request. The database is dynamically updated as each new request is received. The invention works with a client/server model because the server receives many requests from many different clients. The database can further be used to analyse trends in polymorphic malware, and determine patterns that may assist in combating the malware.

Furthermore, the server 16 can generate fingerprints based on received metadata, for example, using the results of the behaviour analysis of the suspicious file as reported by the clients. These fingerprints can be used in identifying polymorphic malware.

It will be appreciated by the person of skill in the art that various modifications may be made to the above described embodiment without departing from the scope of the present invention. For example, the database is described as being located at the server, but it will be apparent that the database may be located in a separate entity to the server, in which case the server will send queries remotely to the database.

The invention claimed is:

1. A method of identifying an electronic file as polymorphic malware, the method comprising:
   at a server, receiving from a client device a hash value and metadata associated with an electronic file;
   comparing the metadata with corresponding metadata stored at a database;
   determining that the received metadata relates to corresponding metadata stored at a database, the corresponding stored metadata being associated with a further hash value that differs from the received hash value;
   determining that the received hash values have been reported by fewer than a predetermined number of clients; and
   as a result, determining a likelihood that the electronic file is polymorphic malware and prioritizing the electronic file for further analysis.

2. The method according to claim 1, further comprising;
   comparing the received hash value and metadata with known fingerprints stored at the database;
   in the event that any of the received hash value and/or metadata corresponds to at least a portion of a fingerprint stored at the database, determining that the electronic file is clean or malware.

3. The method according to claim 1, further comprising, in the event that a determination of the likelihood that the electronic file is polymorphic malware cannot be made, alerting a user.

4. The method according to claim 1, further comprising adding the received metadata to the database.

5. The method according to claim 1, further comprising at the server, generating a fingerprint for the electronic file, the fingerprint being based on the received metadata.

6. An anti-virus server comprising:
a receiver for receiving from a client device a received hash value and received metadata associated with an electronic file;
means to access a database in which are stored records of queries from other client devices, each record comprising a hash value and metadata, the metadata being stored in clusters of metadata;
a processor for comparing the metadata with corresponding metadata stored at the database; and
further arranged for determining that the received metadata is similar to corresponding metadata stored at the database, the corresponding stored metadata being associated with a further hash value that differs from the received hash value;
the processor being further arranged to determine that fewer than a predetermined number of queries including hash values matching the received hash value have been received by the server; and
the processor is further arranged to prioritize the electronic file for further analysis in the event that a determined likelihood indicates that the electronic file is polymorphic malware.

7. The anti-virus server according to claim 6, wherein the processor is arranged to compare the received hash value and metadata with known fingerprints stored at the database and, in the event that any of the received hash value and metadata corresponds to at least a portion of a fingerprint stored at the database, determine that the electronic file is clean or malware.

8. The anti-virus server according to claim 6, wherein the processor is further arranged to alert a user in the event that a determination of the likelihood that the electronic file is polymorphic malware cannot be made.

9. The anti-virus server according to claim 6, wherein the processor is further arranged to add the received metadata to the metadata cluster.

10. The anti-virus server according to claim 6, wherein the processor is arranged to generate a signature for the electronic file, the signature being based on the received metadata.

11. A non-transitory program storage device comprising computer readable code which, when run on a server, causes the server to perform the method as claimed in claim 1.

* * * * *